(12) United States Patent
Schmidt et al.

(10) Patent No.: US 8,255,545 B1
(45) Date of Patent: Aug. 28, 2012

(54) DUAL-PHASE CONTENT SYNCHRONIZATION

(75) Inventors: Edward T. Schmidt, San Francisco, CA (US); Gordon J. Freedman, San Jose, CA (US); Nitin K. Ganatra, San Jose, CA (US); Thomas M. Alsina, Mountain View, CA (US); Christopher R. Wysocki, Los Gatos, CA (US); Thomas G. Adcox, Walnut Creek, CA (US); Henry Mason, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/250,696

(22) Filed: Sep. 30, 2011

Related U.S. Application Data

(63) Continuation of application No. 13/153,188, filed on Jun. 3, 2011.

(51) Int. Cl.
*G06F 15/16* (2006.01)
(52) U.S. Cl. .................. 709/227; 709/229; 709/239
(58) Field of Classification Search ............ 709/203, 709/208, 217, 218, 219, 223, 224, 227, 231, 709/248
See application file for complete search history.

(56) References Cited

U.S. PATENT DOCUMENTS

| | | | |
|---|---|---|---|
| 7,576,752 B1 | 8/2009 | Benson et al. | |
| 7,925,790 B2 | 4/2011 | Xue et al. | |
| 2003/0185195 A1* | 10/2003 | Dowling et al. | 370/349 |
| 2003/0227892 A1* | 12/2003 | Cabana | 370/338 |
| 2006/0224461 A1 | 10/2006 | Montulli et al. | |
| 2007/0204049 A1* | 8/2007 | Herrod | 709/227 |
| 2010/0121815 A1 | 5/2010 | Silverman et al. | |
| 2010/0146133 A1* | 6/2010 | Perrin et al. | 709/229 |
| 2010/0257281 A1* | 10/2010 | Patel et al. | 709/239 |

* cited by examiner

*Primary Examiner* — Barbara Burgess
(74) *Attorney, Agent, or Firm* — Blakely, Sokoloff, Taylor & Zafman LLP

(57) ABSTRACT

Metadata is synchronized between a mobile device and a remote node over a first network, where the metadata specifies media content to be synchronized between the mobile device and the remote node. Subsequently a network connection is established with the remote node over a second network. The media content is bi-directionally synchronized between the mobile device and the remote node over the second network based on the metadata that was synchronized over the first network.

21 Claims, 5 Drawing Sheets

DUAL-PHASE CONTENT SYNCHRONIZATION

RELATED APPLICATIONS

This application is a continuation application of co-pending U.S. patent application Ser. No. 13/153,188, filed Jun. 3, 2011, which is incorporated by reference herein in its entirety.

FIELD OF THE INVENTION

Embodiments of the present invention relate generally to content synchronization of a device. More particularly, embodiments of the invention relate to dual-phase content synchronization of a device.

BACKGROUND

Portable devices such as portable media players have come more popular in recent years. The capabilities of such devices, such as processing and storage capabilities, continue to increase, and many rank-and-file users desire to synchronize their PDAs and similar devices to, for example, their desktop computers. Such synchronization is readily available using synchronization software, where every time a device is connected to the computer, or inserted into a cradle, which is connected to a computer, a synchronization dialog starts between the device and the computer, and data can be transferred in both directions.

As content or files such as movies become larger and larger, time required for the synchronization becomes longer and longer. Such a long synchronization may easily be interrupted, for example, by poor connection or user interruption, etc. Typically, if the synchronization is interrupted, the entire synchronization has to restart over.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, content or data synchronization between a device and a remote node (e.g., desktop or server) is configured into at least two phases. During a first phase, metadata describing the content or data to be synchronized is synchronized between two endpoints. Subsequently, during a second phase, the actual content or data (e.g., payloads) is then synchronized based on the metadata. In one embodiment, the content synchronization during the second phase is further configured to be carried out in multiple segments. Each segment can be independently or sequentially synchronized over a different period of time, where each segment may be specified by the metadata synchronized during the first phase.

In one embodiment, based on the metadata that has been synchronized in the first phase, segments of the content can be synchronized over different network connections and/or different networks, using different communications protocols. The segments of content may be synchronized with multiple different servers (e.g., content distribution servers or mirrored servers) dependent upon the circumstances at the point in time (e.g., time, location, and/or bandwidth). The segments of content synchronization can also be performed (e.g., "picked up") automatically without further user intervention, in response to detection of the availability of network connections. As a result, the overall content synchronization can be started, stopped, and restarted at different time and places, without having to restart the entire content synchronization or resynchronize a segment that has been previously synchronized.

Figure 1:
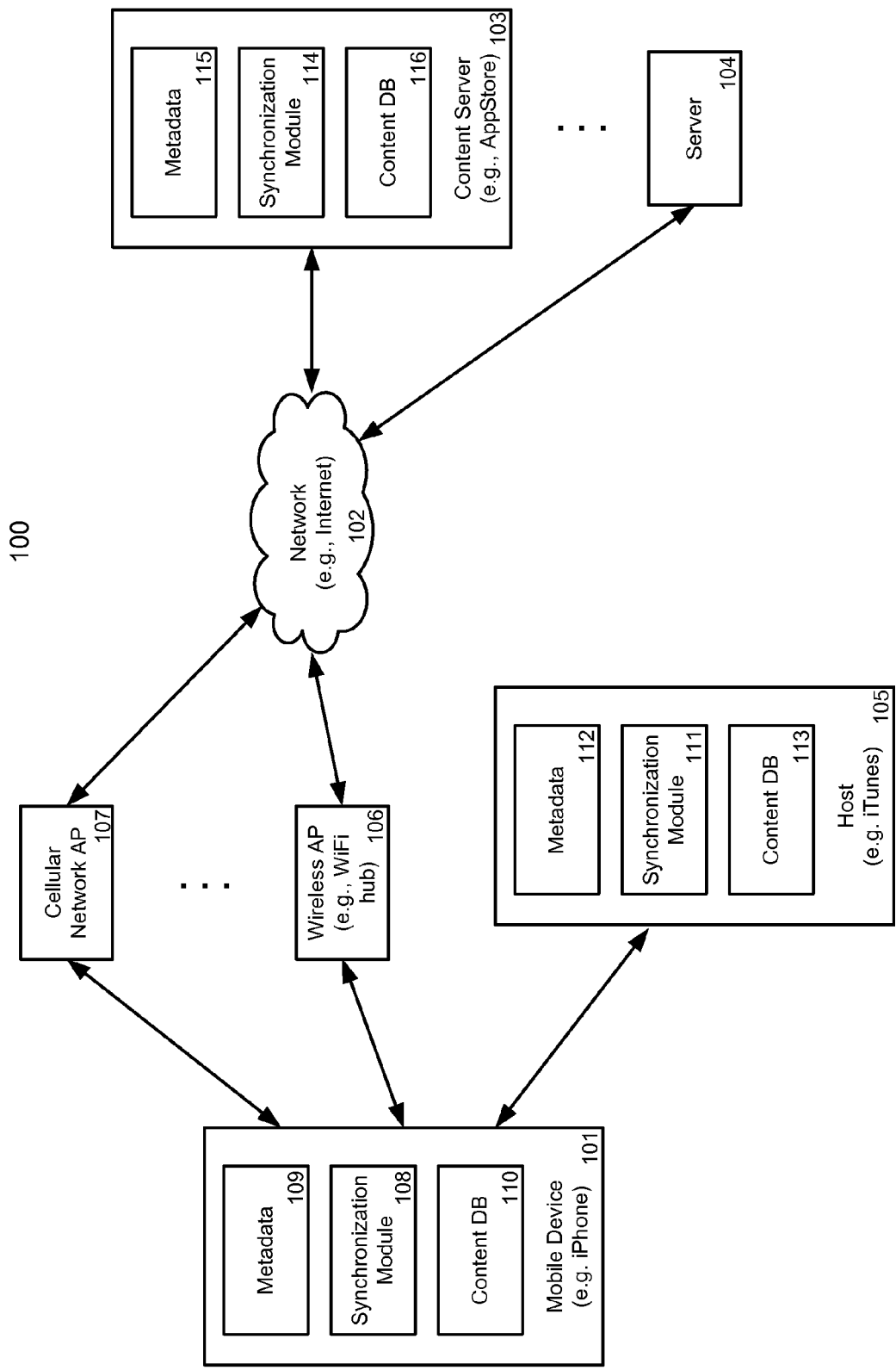
FIG. 1 is a block diagram illustrating a system for multiple phase content synchronization according to one embodiment of the invention.

FIG. 1 is a block diagram illustrating a system for multiple phase content synchronization according to one embodiment of the invention. Referring to FIG. 1, system 100 includes mobile device 101 communicatively coupled to servers 103-104 over network 102. Mobile device 101 may be any kind of portable devices such as, for example, a laptop, a tablet, a mobile phone (e.g., Smartphone), a media player, a personal digital assistant (PDA), a gaming device, etc. For example, Mobile device 101 may be an iPhone™ or iPod™ device available from Apple® Inc. of Cupertino, Calif. Network 102 may be any kind of network such as, local area network (LAN), wide area network (WAN) such as the Internet, or a combination thereof. Servers 103-104 may be any kind of servers such as content distribution servers, which may be implemented as part of a cloud or server farms. For example, servers 103-104 may be part of an iTunes™ Appstore available from Apple Inc.

In one embodiment, mobile device can communicate with servers 103-104 over a wireless network via a wireless access point (AP) 106. For example, mobile device 101 can communicate with servers 103-104 via a WiFi network provided by a WiFi hub or hotspot, for example, for the purpose of content synchronization. Furthermore, if mobile device 101 includes cellular communication capability (e.g., a mobile phone or Smartphone), mobile device 101 can also communicate with servers 103-104 over a cellular network, for example, for the purpose of content synchronization. In addition, device 101 can also communicate, for example, via a universal serial bus (USB), with host 105 for the purpose of content synchronization between device 101 and host 105, which may be a desktop or laptop operating as a local store. Throughout this application, the term of "content" may refer to any payload data, such as media content (e.g., songs or movies), applications to be installed, or other data files (e.g., documents), etc.

In one embodiment, mobile device 101 includes synchronization module 108 to synchronize content with a remote node. For example, synchronization module 108 can communicate with synchronization module 111 of host 105 for content synchronization between mobile device 101 and host 105. Alternatively, synchronization module 108 can communicate with synchronization module 114 of server 103 for content synchronization between mobile device 101 and server 103, which may be via wireless AP 106 and/or cellular AP 107.

For the illustration purpose only, it is assumed mobile device 101 attempts to synchronize content with server 103 over network 102. In one embodiment, the content synchronization is performed in multiple phases. During a first phase, synchronization module 108 communicates with synchronization module 114 to synchronize metadata 109 and 115. The metadata describes content such as content 110 and content 116 to be synchronized in a subsequent phase or phases. Subsequently, the actual content is synchronized between mobile device 101 and server 103, for example, over different periods of time and/or different network connections.

Since the metadata in general has a relatively smaller size, it can be synchronized in a shorter period of time. That is, the metadata is more likely synchronized without interruption. However, the actual content could have a larger size of payload. For example, a movie file may have a larger size and it may take longer time to download from server 103 to mobile device 101, or vice versa. In one embodiment, the actual content can be synchronized in multiple segments during the subsequent phase or phases based on the metadata. That is, once the metadata has been synchronized, the actual content can be broken up in multiple segments and individually synchronized over multiple periods of time without having to continuously synchronize the entire content. This is very useful when the content file is large and the connection, particularly a wireless connection, to the remote node may be lost during the synchronization. During the content synchronization, if the connection is lost, the synchronization can be subsequently picked up during a subsequent connection session based on the metadata, without having to restart the entire synchronization.

According to one embodiment, once the metadata has been synchronized, a user of the device can start interact with at least a portion of the content. For example, the user can view at least some of the music tracks being or to be synchronized. A graphical representation (e.g., icon or different colors) may be utilized to indicate that the content has not been completely synchronized. For example, a music track that has not been completely transferred may be displayed in gray with a progress indicator indicating that the content synchronization for the associated music is being performed. According to a further embodiment, content to be synchronized may be prioritized, for example, based on size, type, or user specific configuration. For example, content with a smaller size may be synchronized prior to those with larger sizes.

Figure 2:
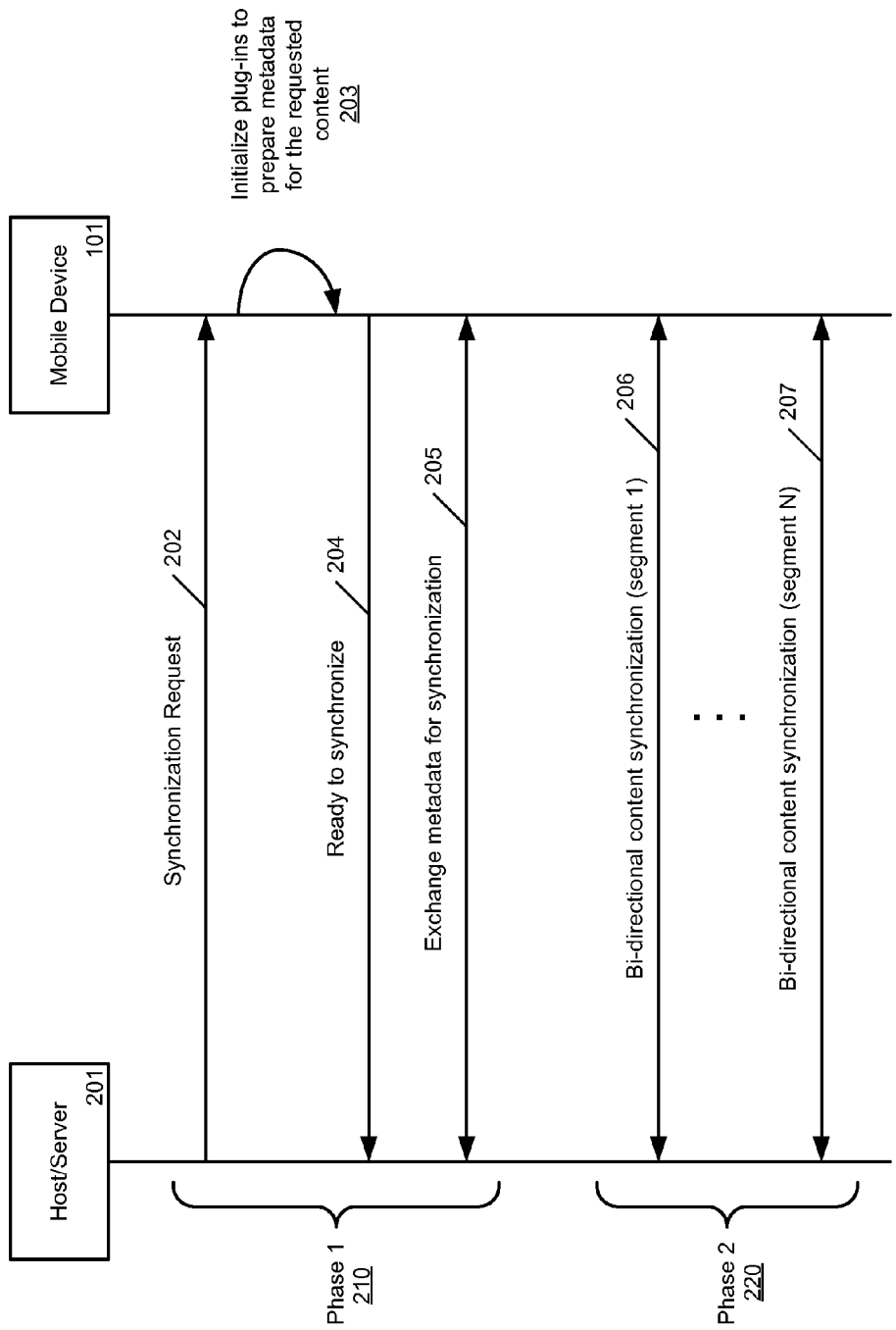
FIG. 2 is a transactional diagram illustrating transactions of content synchronization according to one embodiment of the invention.

FIG. 2 is a transactional diagram illustrating transactions of content synchronization according to one embodiment of the invention. Referring to FIG. 2, node 201 can represent host 105 and/or any of servers 103-104 of FIG. 1. Initially, when mobile device 101 is communicatively coupled to node 201, via transaction 202, node 201 transmits a request for content synchronization to mobile device 101. For example, mobile device 101 can be connected to a host via a local connection such as a universal serial bus (USB), which may be detected by the host. In response to such detection, the host transmits the synchronization request to mobile device 101. The request may include one or more identifiers (IDs) identifying certain type or types of content (e.g., movies, songs, books, etc.) to be synchronized. For example, a user may wish to synchronize an application with a first device, to synchronize music with a second device, and to synchronize photos with a third device, etc. In response to the synchronization request, via transaction 203, mobile device 101 is configured to invoke one or more appropriate plug-in applications to retrieve or compile metadata representing the content identified by the request that is currently stored in mobile device. The content may be audio, video, an application, a game, etc. Examples of plug-ins include an application plug-in that services applications or a media plug-in that services music, videos, and podcasts, etc.

During transaction 204, mobile device 101 responds with a message indicating that it is ready to synchronize metadata and during transaction 205, mobile device 101 and node 201 synchronize the metadata. The metadata may includes purchasing data for purchasing or downloading an item (e.g., application) from node 201, a list of media assets stored in mobile device 101, user edits on mobile device 101 (e.g., playlist, skip, play count), deletion of media content (e.g., song, movie), graphics user interface (GUI) settings (e.g., icon order or arrangement), installed application(s), and previous synchronization status, etc. Examples of metadata can also include library data such as artists, album names, song titles, or collection information such as playlists and their associated tracks, edits applied to photos, asset version and encoding information. Transactions 202-205 are referred to as first phase 210 of synchronization. Once the metadata has been synchronized, first phase 210 ends.

Second phase 220 can start any time after first phase 210 ends. During second phase 220, the content is synchronized via transactions 206-207. The content may be synchronized in segments and some of the segments may be synchronized individually over different periods of time, different network connections, different networks, and/or with different content provider sources. For example, during transaction 206, some segments of the content may be synchronized over a WiFi connection during a first time period based on the metadata. During transaction 207, some segments (e.g., non-overlapped or non-duplicated segments) may be synchronized over a cellular network during a second or other time periods based on the metadata. For example, metadata may include a list of asset identifiers (e.g., one for each synchronized asset that should exist on the device), and for each identifier, an indication of whether or not that asset is currently present on the device. When a synchronization session needs to resume in the second phase, the metadata can be scanned, and any identifiers that are not present on the device are assets that still need to be requested.

Referring back to FIG. 1, for example, when user plugs its mobile device 101 into host 105 (e.g., via a USB connection), host 105 automatically detects the presence of mobile device 101 (e.g., using certain plug-and-play handshaking protocols). Host 105 starts the first phase of synchronization by synchronizing metadata 112 with metadata 109 of mobile device 101 for the purpose of synchronizing content 113 with content 110 of mobile device 101. Content 110 may have been synchronized with content 116 of server 103 previously, but has not been synchronized with host 105. In this example, server 103 may be an application store and content 116 may be the content asset associated with a user of mobile device 101 (e.g., user account). Thus, content 116 may have been purchased or acquired by the user of mobile device 101.

After metadata 109 has been synchronized with metadata 112 of host 105, the first phase ends and the second phase of the content synchronization may start. The second phase may start automatically without user intervention or user knowledge dependent upon the operating condition at the point in time. For example, if connection between mobile device 101 and host 105 is still available after the first phase, the second phase can start immediately without interruption.

As described above, the second phase of content synchronization may be broken up into multiple segments and such segments can be subsequently synchronized at different time and/or places dependent upon the circumstances. For example, during the synchronization of the content of the second phase, mobile device is disconnected from host 105 and as a result, the content synchronization is interrupted. In this example, the uses may walk away from host 105 with mobile device 101, etc. Thus, only a portion (e.g., first portion or segment) of the content has been synchronized.

Subsequently, when the user comes back, mobile device 101 may be reconnected with host 105. Once mobile device 101 has been detected by host 105, host 105 and mobile device 101 may again perform the handshaking process (e.g., first phase 210 of FIG. 2) to determine whether the metadata has been synchronized. If the metadata are still synchronized (e.g., both mobile device 101 and host 105 have similar or identical metadata 109 and 112), the content synchronization can be continued (e.g., picked up) from where it has been left off from the previous synchronization session based on the metadata, without the need of restarting the entire content synchronization. These detection and/or synchronization processes may be performed automatically without user intervention or knowledge.

If during the first phase process after mobile device 101 reconnects with host 105, it is detected that the metadata 109 and 112 are not synchronized, mobile device 101 and host 105 will perform additional first phase synchronization process to synchronize the metadata. This could happen while mobile device 101 is disconnected from host 10, device 101 performs another content synchronization with server 103. As a result, metadata 109 and/or content 110 of mobile device may be updated from server 103, which leads to the discrepancy between metadata 109 and 112, and/or content 110 and 113. Once the metadata has been resynchronized, the existing content and/or the new content associated with the new metadata can be synchronized in the continued second phase and/or subsequent phase(s) of content synchronization.

In another scenario, after the metadata has been synchronized between mobile device 101 and server 103 during the first phase, mobile device 101 may be disconnected from server 103 and roam to another network such as a WiFi network. Mobile device 101 can log onto the network via the associated access point 106 and connect with server 103. For example, after disconnecting mobile device 101 from server 103 via a first network connection, a user can travel to another location such as a WiFi hotspot and mobile device 101 can reconnect with network 102 via the WiFi network. According to one embodiment, the second phase of content synchronization can continue over the new network connection, based on the metadata that has been synchronized during the first phase. Similarly, mobile device 101 can also continue the second phase of content synchronization over another network such as a cellular network via the associated AP 107, etc.

According to another embodiment, dependent upon the location of mobile device 101 at the point in time, the second phase of content synchronization can be continued or picked up between mobile device 101 and different content distribution servers 103-104. For example, servers 103-104 may be part of a content distribution cloud or sever farm. At a first point in time, the content may be synchronized with server 103. At a second point in time, the content may be synchronized with server 104. The synchronization of the content may be performed with servers 103-104 without overlap.

According to a further embodiment, prior to the second phase, at least some of the content is copied to a designated storage location within mobile device 101 (not shown), where the content is transmitted from the designated storage location to a remote node. In this manner, even if the user deletes the content after the first phase, the actual content would still be successfully synchronized from the designated storage location with the remote node. For example, a user may issue a purchase order for media content provided by server 103, where the purchase order is part of the content to be synchronized with server 103.

After the first phase but before the second phase, the user may delete the purchase order from its normal place (e.g., AppStore software application) based on the assumption that the purchase has been completed. By maintaining a copy of the purchase order in the designated storage location, the purchase order data can be subsequently synchronized with server 103, even though the actual purchase order data has been deleted by the user. This mechanism gives the user an impression that once the first phase is completed, the actual content synchronization will be completed eventually. In one embodiment, the designated storage location is not user accessible (e.g., invisible to a user).

Figure 3:
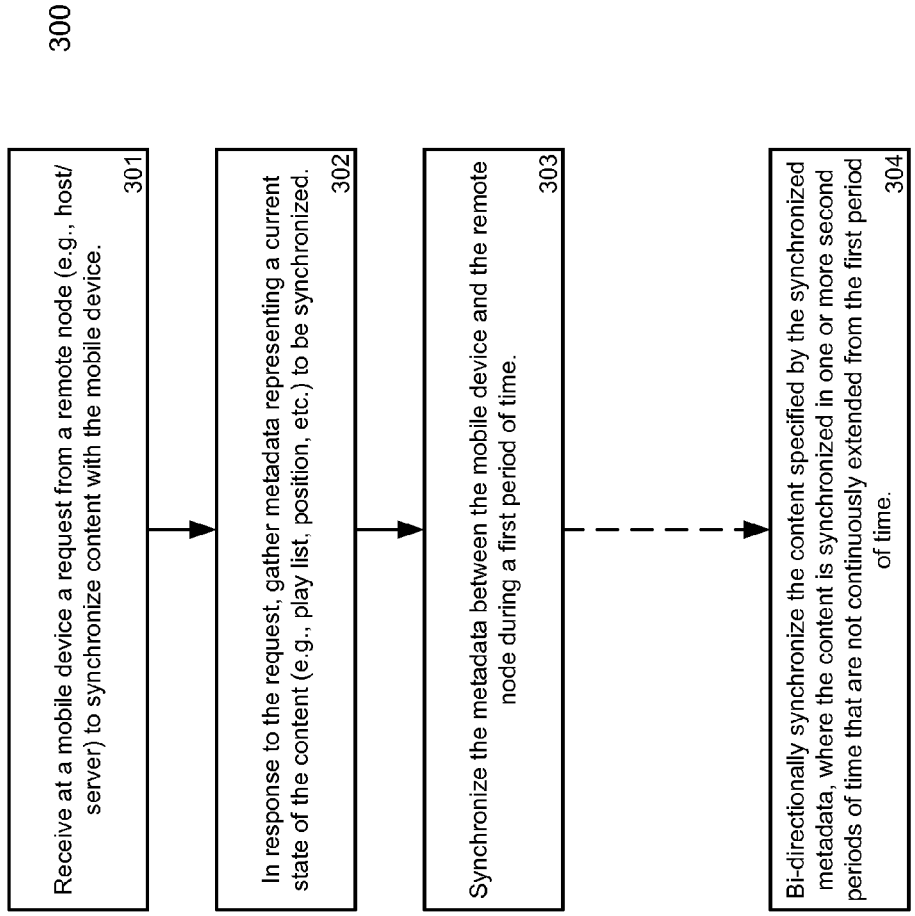
FIG. 3 is a flow diagram illustrating a method for synchronizing content according to one embodiment of the invention.

FIG. 3 is a flow diagram illustrating a method for synchronizing content according to one embodiment of the invention. Method 300 may be performed by system 100 of FIG. 1, such as mobile device 101. Referring to FIG. 3, at block 301, a request for content synchronization is received from a remote node (e.g., host 105 and/or servers 103-104 of FIG. 1). The request may include information identifying the content to be synchronized, where the content may be media content (e.g., a song or movie) or an application to be installed. In response to the request, at block 302, metadata associated with the content to be synchronized is gathered, for example, via the associated plug-ins. At block 303, the metadata is synchronized with the remote node. Subsequently, at block 304, the content is bi-directionally synchronized between a local node and the remote node, where the content is synchronized in segments at different periods of time, connections, and/or locations. Operations involved in blocks 301-303 are considered as part of the first phase of the content synchronization while block 304 is considered as part of the second phase of the content synchronization.

Figure 4:
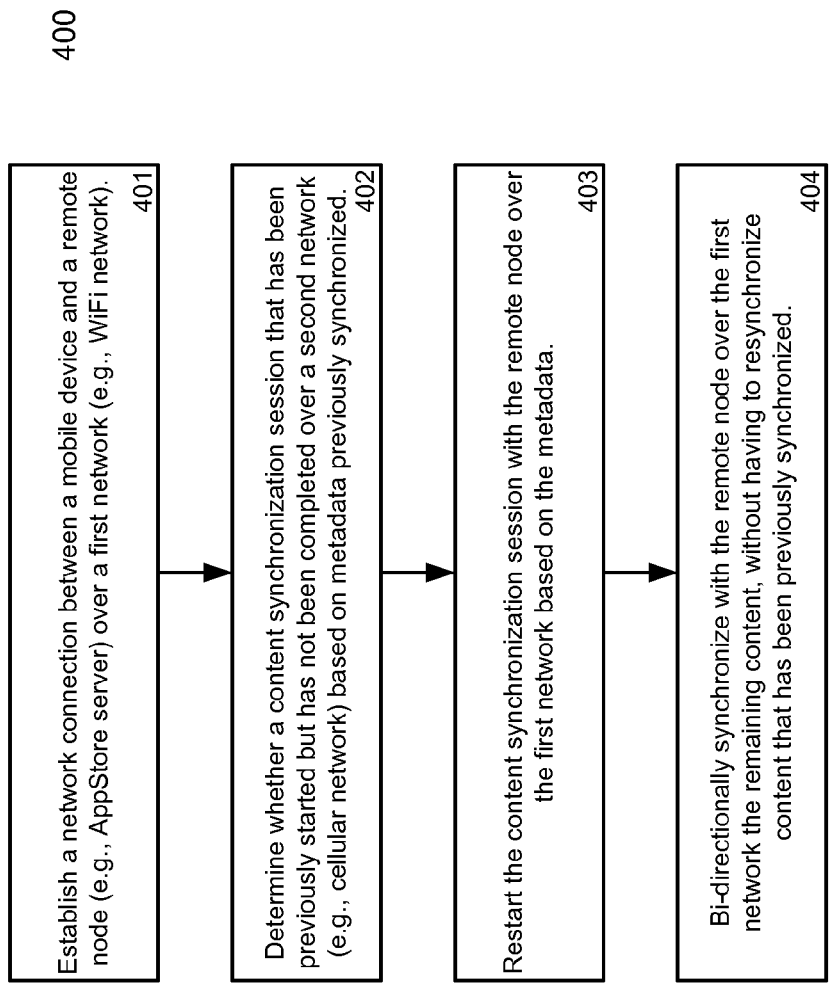
FIG. 4 is a flow diagram illustrating a method for synchronizing content according to one embodiment of the invention.

FIG. 4 is a flow diagram illustrating a method for synchronizing content according to one embodiment of the invention. Method 400 may be performed by system 100 of FIG. 1, such as mobile device 101. Referring to FIG. 4, at block 401, a network connection is established between a mobile device and a remote node (e.g., content server) over a first network (e.g., WiFi network). At block 402, processing logic determines whether a content synchronization session has been previously started but has not been completed over a second network (e.g., cellular network) based on metadata that has been previously synchronized. In addition, if there is any new metadata that is available from the remote node, but is not in the mobile device, the new metadata is also synchronized. At block 403, the content synchronization session is restarted with the remote node over the first network based on the metadata. At block 404, the remaining content, as well as, any new content identified by the new metadata, is bi-directionally synchronized with the remote node without having to resynchronize the content that has been previously synchronized.

Figure 5:
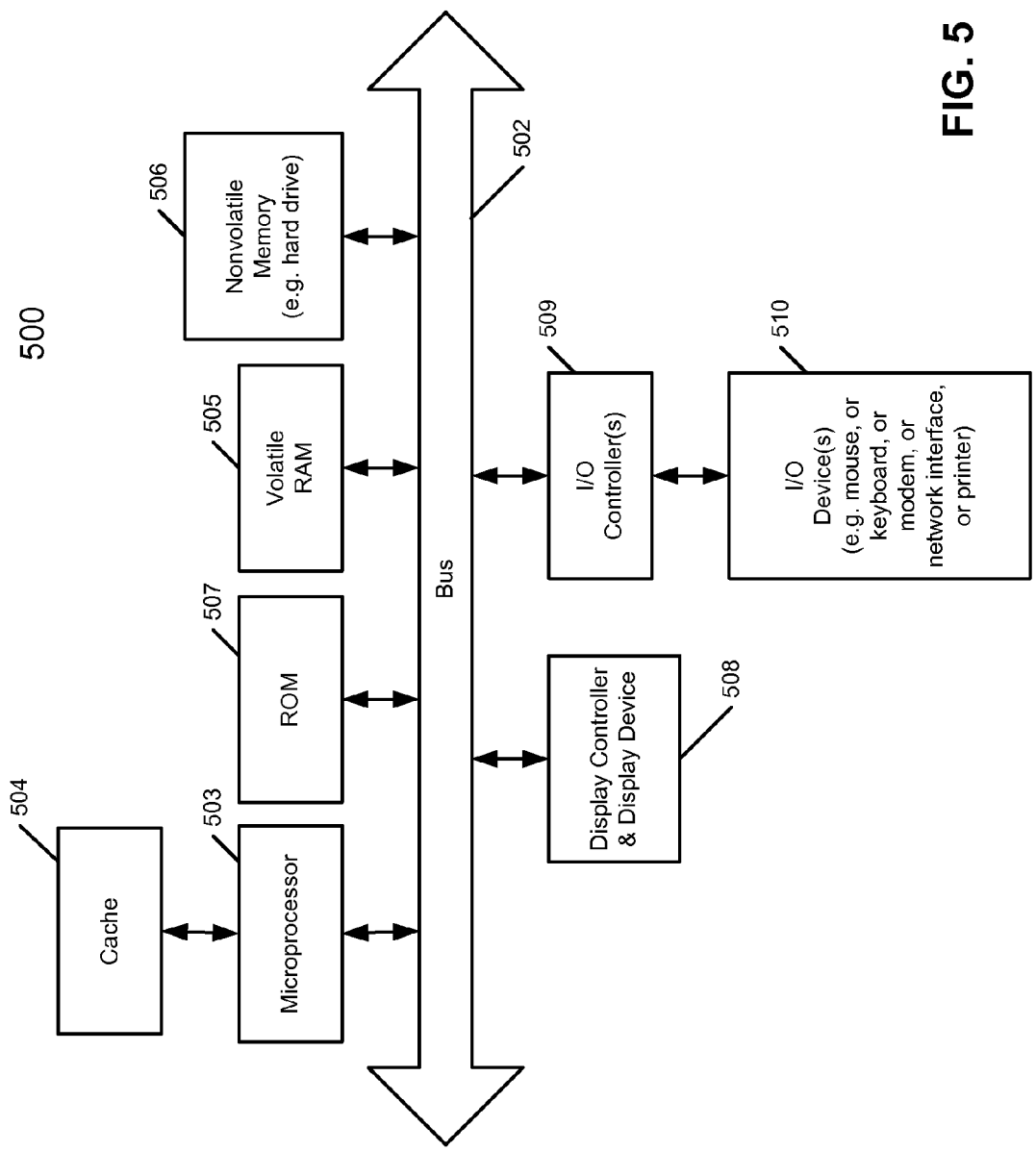
FIG. 5 is a block diagram of a data processing system, which may be used with one embodiment of the invention.

FIG. 5 is a block diagram of a data processing system, which may be used with one embodiment of the invention. For example, the system 500 may be used as part of mobile device 101, host 105, and/or servers 103-104 as shown in FIG. 1. Note that while FIG. 5 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 5 may, for example, be an Apple Macintosh computer or MacBook, an IBM compatible PC, or a computer server.

As shown in FIG. 5, the computer system 500, which is a form of a data processing system, includes a bus or interconnect 502 which is coupled to one or more microprocessors 503 and a ROM 507, a volatile RAM 505, and a non-volatile memory 506. The microprocessor 503 is coupled to cache memory 504. The bus 502 interconnects these various components together and also interconnects these components 503, 507, 505, and 506 to a display controller and display device 508, as well as to input/output (I/O) devices 510, which may be mice, keyboards, modems, network interfaces, printers, and other devices which are well-known in the art.

Typically, the input/output devices 510 are coupled to the system through input/output controllers 509. The volatile RAM 505 is typically implemented as dynamic RAM (DRAM) which requires power continuously in order to refresh or maintain the data in the memory. The non-volatile memory 506 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 5 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 502 may include one or more buses connected to each other through various bridges, controllers, and/or adapters, as is well-known in the art. In one embodiment, the I/O controller 509 includes a USB (Universal Serial Bus) adapter for controlling USB peripherals. Alternatively, I/O controller 509 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:

synchronizing, by a synchronization module executed by a processor of a mobile device, metadata between the mobile device and a remote node over a first network connection of a first network, the metadata specifying media content to be synchronized between the mobile device and the remote node, the media content representing one of a song, a movie, an electronic book, and a video game;

synchronizing by the synchronization module between the mobile device and the remote node a first portion of the media content based on the synchronized metadata over the first network connection;

subsequently establishing a second network connection with the remote node over a second network; and bi-directionally synchronizing by the synchronization module a second portion of the media content between the mobile device and the remote node over the second network connection based on the metadata that was synchronized over the first network connection, without having to re-synchronize the entire first portion of the media content, wherein the first and second portions are non-overlapped segments of the media content;

identifying a media plug-in application associated with a type of the media content; and invoking the identified media plug-in application to process the metadata being synchronized and to determine a boundary between the first and second portions of the media content based on the metadata.

2. The method of claim 1, wherein the remote node is one of a host computer coupled to the mobile device via a local connection and a content provider server communicatively coupled to the mobile device over the Internet.

3. The method of claim 1, wherein the first network is a wired connection coupled to a host computer which is communicatively coupled to the remote node over the Internet, and wherein the second network is a wireless network communicatively coupling the mobile device with the remote node.

4. The method of claim 1, further comprising maintaining a copy of a first media content to be synchronized from the mobile device to the remote node in a designated storage area of the mobile device that is invisible to a user of the mobile device, wherein the content synchronization from the mobile device to the remote node is performed based on the copy of the first media content stored in the invisible designated storage area, such that content synchronization of the first media content can continue even if the first content media has been accidentally deleted by the user from a content database of the mobile device.

5. The method of claim 1, wherein bi-directionally synchronizing the media content comprises:
synchronizing the second portion of the media content with the remote node over the second network connection based on the synchronized metadata prior to an interruption of the synchronization;
subsequently after the interruption of the synchronization, establishing a third network connection with the remote node over a third network; and
synchronizing a third portion of the media content with the remote node over the third network connection based on the synchronized metadata, without having to re-synchronizing the second portion of the media content, wherein the first, second, and third portions of the media content are non-overlapped segments of the media content.

6. The method of claim 5, wherein the third network connection of the third network with the remote node is automatically established in response to detecting availability of the third network, and wherein the third portion of the media content is automatically synchronized based on the synchronized metadata without user intervention or user knowledge.

7. The method of claim 1, wherein the media content is one of a plurality of media content files to be synchronized, wherein the media content files are to be synchronized according to a prioritized order based on at least one of types of the media content files and sizes of the media content files, and wherein the prioritized order is user configurable.

8. A non-transitory computer-readable storage medium having instructions stored therein, which when executed by a computer, cause the computer to perform a method, the method comprising:
synchronizing metadata between a mobile device and a remote node over a first network connection of a first network, the metadata specifying media content to be synchronized between the mobile device and the remote node, the media content representing one of a song, a movie, an electronic book, and a video game;
synchronizing by the synchronization module between the mobile device and the remote node a first portion of the media content based on the synchronized metadata over the first network connection;
subsequently establishing a second network connection with the remote node over a second network; and
bi-directionally synchronizing a second portion of the media content between the mobile device and the remote node over the second network connection based on the metadata that was synchronized over the first network connection, without having to re-synchronize the entire first portion of the media content, wherein the first and second portions are non-overlapped segments of the media content;
identifying a media plug-in application associated with a type of the media content; and
invoking the identified media plug-in application to process the metadata being synchronized and to determine a boundary between the first and second portions of the media content based on the metadata.

9. The non-transitory computer-readable storage medium of claim 8, wherein the remote node is one of a host computer coupled to the mobile device via a local connection and a content provider server communicatively coupled to the mobile device over the Internet.

10. The non-transitory computer-readable storage medium of claim 8, wherein the first network is a wired connection coupled to a host computer which is communicatively coupled to the remote node over the Internet, and wherein the second network is a wireless network communicatively coupling the mobile device with the remote node.

11. The non-transitory computer-readable storage medium of claim 8, wherein the method further comprises maintaining a copy of a first media content to be synchronized from the mobile device to the remote node in a designated storage area of the mobile device that is invisible to a user of the mobile device, wherein the content synchronization from the mobile device to the remote node is performed based on the copy of the first media content stored in the invisible designated storage area, such that content synchronization of the first media content can continue even if the first content media has been accidentally deleted by the user from a content database of the mobile device.

12. The non-transitory computer-readable storage medium of claim 8, wherein bi-directionally synchronizing the media content comprises:
synchronizing the second portion of the media content with the remote node over the second network connection based on the synchronized metadata prior to an interruption of synchronization;
subsequently after the interruption of the synchronization, establishing a third network connection with the remote node over a third network; and
synchronizing a third portion of the media content with the remote node over the third network connection based on the synchronized metadata, without having to re-synchronizing the second portion of the media content, wherein the first, second, and third portions of the media content are non-overlapped segments of the media content.

13. The non-transitory computer-readable storage medium of claim 12, wherein the third network connection of the third network with the remote node is automatically established in response to detecting availability of the third network, and wherein the third portion of the media content is automatically synchronized without user intervention or user knowledge.

14. A mobile device, comprising:
a processor; and
a memory coupled to the processor for storing instructions which when executed from the memory, cause the processor to:
synchronize metadata between the mobile device and a remote node over a first network connection of a first network, the metadata specifying media content to be synchronized between the mobile device and the remote node, the media content representing one of a song, a movie, an electronic book, and a video game;
synchronize between the mobile device and the remote node a first portion of the media content based on the synchronized metadata over the first network connection; subsequently establish a second network connection with the remote node over a second network; and
bi-directionally synchronize a second portion of the media content between the mobile device and the remote node over the second network connection based on the metadata that was synchronized over the first network connection, without having to re-synchronize the entire first portion of the media content, wherein the first and second portions are non-overlapped segments of the media content;
identifying a media plug-in application associated with a type of the media content; and
invoking the identified media plug-in application to process the metadata being synchronized and to determine a boundary between the first and second portions of the media content based on the metadata.

15. The mobile device of claim 14, wherein the remote node is one of a host computer coupled to the mobile device via a local connection and a content provider server communicatively coupled to the mobile device over the Internet.

16. The mobile device of claim 14, wherein the first network is a wired connection coupled to a host computer which is communicatively coupled to the remote node over the Internet, and wherein the second network is a wireless network communicatively coupling the mobile device with the remote node.

17. A computer-implemented method, comprising:
in response to establishing a first network connection between a mobile device and a remote node over a first network, examining synchronization metadata stored in the mobile device to determine whether a content synchronization session with a remote node was started but was not completed previously over a second network connection, wherein the synchronization metadata was synchronized between the mobile device and the remote node over the second network connection, the synchronization metadata describing a media content to be synchronized, wherein the media content represents one of a song, a movie, an electronic book, and video game, wherein a first portion of the media content has been synchronized previously over the second network connection; and
restarting the synchronization session with the remote node based on the synchronization metadata to bi-directionally synchronize a second portion of the media content that has not been synchronized over the first network connection, without having to re-synchronize the first portion that has been previously synchronized over the second network connection, wherein the first and second portions are non-overlapped segments of the media content;
identifying a media plug-in application associated with a type of the media content; and
invoking the identified media plug-in application to process the metadata being synchronized and to determine a boundary between the first and second portions of the media content based on the metadata.

18. The method of claim 17, wherein the synchronization metadata was synchronized between the mobile device and the remote node over a third network.

19. The method of claim 17, wherein synchronization session is restarted automatically based on the synchronization metadata without user intervention or user knowledge, in response to a detection of the network connection with the remote node over the first network.

20. The method of claim 1, further comprising:
receiving a request to play the media content from a user of the mobile device, after the first portion of the media content has been synchronized and prior to completing synchronization of the second portion of the media content;
playing the first portion of the media content in response to the request; and
displaying a graphical representation to indicate that the second portion of the media content has not been completely synchronized.

21. The method of claim 20, wherein displaying a graphical representation comprises:
displaying one or more first tracks representing the first portion of the media content in a first color; and
displaying one or more second tracks representing the second portion of the media content in a second color that is different than the first color.

\* \* \* \* \*